June 14, 1966  A. L. EMRY  3,255,982
FISHING REEL
Filed Feb. 28, 1964  2 Sheets-Sheet 1

INVENTOR
ALFRED LEON EMRY
BY
Joseph A. Naughton Jr.
ATTORNEY

June 14, 1966  A. L. EMRY  3,255,982
FISHING REEL
Filed Feb. 28, 1964  2 Sheets-Sheet 2
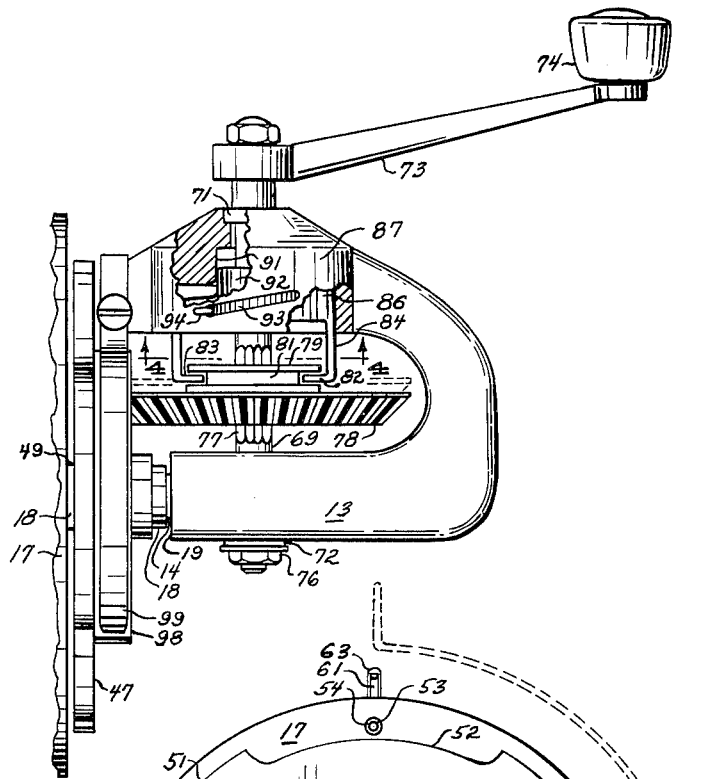
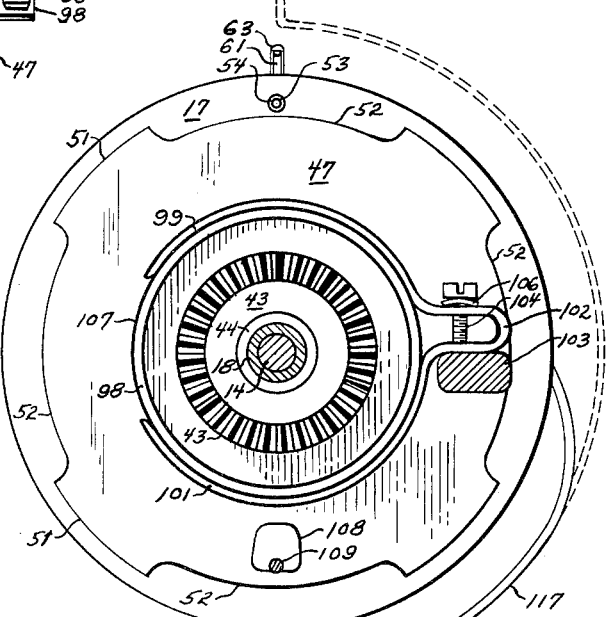
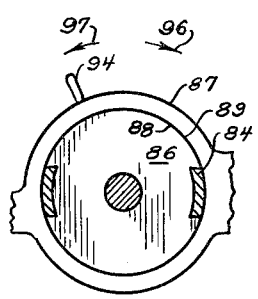
INVENTOR
ALFRED LEON EMRY
BY
Joseph A. Naughton Jr.
ATTORNEY United States Patent Office 3,255,982
Patented June 14, 1966

3,255,982
FISHING REEL
Alfred Leon Emry, Noblesville, Ind., assignor of one-half to Joseph A. Naughton, Jr., Indianapolis, Ind.
Filed Feb. 28, 1964, Ser. No. 348,206
6 Claims. (Cl. 242—84.21)

This invention relates generally to the spinning-type of fishing reel and more particularly to a reel whereby casting can be accomplished by spinning line off the end of a stationary spool or, alternatively, by removing line from a rotating spool.

Most fishing reels which have the line carrying spool axis parallel to the fishing rod, are intended either to release line during casting by spinning it off the end of the spool or by removing it generally tangentially from a rotating spool. They do not accommodate release of line both ways. Moreover, they require axial reciprocation of the spool or a line winding member in order to obtain level winding of the spool.

Another characteristic of most reels heretofore known is that anti-backlash devices therefor are not actually sensitive to line tension during casting. Typically they apply resistance to spool rotation which resistance remains largely constant at an adjusted value during casting. The result is excessive resistance when it is not needed and sometimes inadequate resistance when it is needed during the cast.

It is therefore a general object of this invention to provide an improved fishing reel.

A further object is to provide a reel which can release line from a stationary spool or, alternatively, from a rotating spool.

A further object is to provide a reel adapted to minimizing line twisting.

A further object is to provide a reel in which a level winding of line is attained without axial reciprocation of the spool or of a winding member.

A further object is to provide anti-backlash means which is brought into operation when required by drop in line tension and automatically de-activated upon increase in line tension to a predetermined level.

A further object is to provide a reel having the ability to achieve the foregoing objects and yet characterized by simple and reliable construction and operation.

Described briefly, a typical embodiment of the present invention includes a fishing line carrying spool mounted for rotation on a first axis. A line winding guide is mounted for rotation on a second axis intersecting the spool axis at an angle, the winding guide being movable around the spool for winding line onto the spool. Gearing is provided between the winding guide and the spool whereby the guide and the spool are simultaneously rotated in opposite directions and at different speeds. This arrangement, together with the angular arrangement of the axes, achieves a level wind of the line on the spool.

A trigger operated line pickup guide is movably mounted whereby trigger operation is effective, when desired, to remove line from the winding guide to facilitate spinning line off the end of the spool.

A clutch operable in response to change in line tension, cooperates with braking means to apply braking effort required to avoid backlash, when it is required during casting with the spool rotating.

Other features, objects, and advantages of the present invention will become apparent from the following detailed description of a typical embodiment thereof, considered in connection with the appended drawings herein, where:

FIGURE 2 is a fragmentary top plan view taken of FIGURE 1 with parts shown in section;

FIGURE 3 is a fragmentary section therethrough taken along the line 3—3 in FIGURE 2 and viewed in the direction of the arrows;

FIGURE 4 is a fragmentary section therethrough taken along the line 4—4 in FIGURE 2 and viewed in the direction of the arrows.

Figure 1:
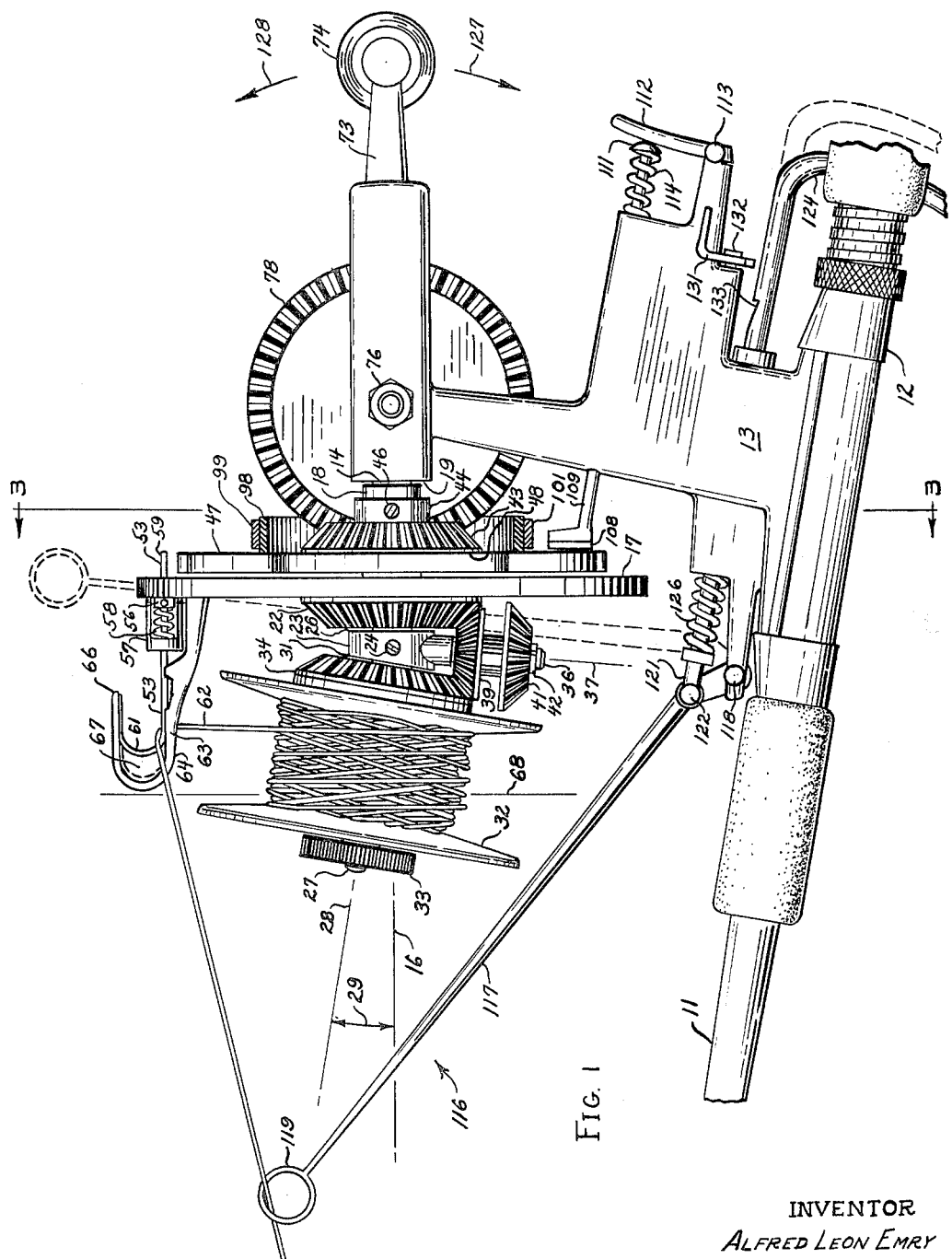
FIGURE 1 is a side elevational view thereof.

Referring now to the drawings in detail, the fishing rod 11 has clamping means 12 securing the base of the fishing reel frame 13 thereto. The frame has a forwardly extending round post 14 thereon, the post having a longitudinal axis 16.

A winding guide carrier disc 17 is mounted for rotation on said post, and has a sleeve 18 extending rearwardly and abuttingly engaging the shoulder 19 on the frame. The bore of the sleeve provides ample bearing surface on the post to properly support the carrier disc and the various parts mounted to it. The rear face of the sleeve provides an axial thrust bearing against the frame shoulder 19. A bevel gear 22 is secured to the front face of the carrier disc, concentric with the bore of the disc.

A spool mounting post member is provided and includes a mounting block 23 received on and secured to the front end of the post 14 by means such as the set screw 24, for example. The rear face 26 of the mounting block 23 serves as the front thrust bearing surface for the carrier disc, being abuttingly engaged by the front face of the gear 22.

The spool mounting post 27 is round and extends ahead of and upwardly from the mounting block 23, the longitudinal axis 28 thereof intersecting the axis 16 at an angle. The angle 29 may be twelve degrees, for example. The axis 28 is normal to the front face 31 of the mounting block 23.

Line carrying spool 32 is mounted for rotation on the post 27 and is retained on the post by a knurled nut 33 threadedly received on the front end of the post 27. A bevel gear 34 is secured to the rear face of the spool. An idler shaft 36 is secured to the mounting block and its axis 37 bisects the obtuse angle between the axes 16 and 28. Idler gears are mounted together for rotation together on the idler shaft. Idler gear engages gears 22 and 34 and, because the idler shaft is stationary, rotates the spool clockwise when the carrier disc is rotated counterclockwise. This idler gear 39, together with idler gear 41, are retained on the idler shaft by the snap ring 42 received in an annular groove near the outer end of the idler shaft.

The purpose of idler gear 41 is to mesh with a bevel gear of larger diameter secured to spool 32 instead of gear 34 if desired, to provide a greater ratio of speed of the carrier disc to the spool. For example, if it is desired to reduce the number of turns of the spool per turn of the carrier, the spool can be removed and replaced by one having an internal type bevel gear thereon engaging idler 41, instead of the external bevel gear 34 engaging idler 39. As an alternative to replacing the spool in its entirety, gear 34 may be removed from the spool and a larger, internal type bevel gear can be secured to the spool by screws or otherwise to engage idler 41.

Gear 43 has a boss 44 thereon and is secured to the sleeve of the carrier disc by means of the set screw 46. A brake member 47 is provided in the form of a disc disposed between carrier disc 17 and the front face 48 of the gear 43. The brake member has a central aperture 49 received on the outer surface of the sleeve 18, and is normally free to rotate on the sleeve.

Clutch means are provided on the carrier disc and brake member. They include a plurality of circularly spaced notches in the outer circumferential surface 51 of the brake member, these notches being identified by the reference numerals 52 in FIGURE 3. On the carrier disc the clutch means include a clutch pin 53 extending through aperture 54 in the carrier disc. A collar 56 is secured to the clutch pin and abuttingly engages the front face of the carrier disc. A spring seat 57 is threadedly received in the carrier disc and thereby secured thereto. A coil spring 58 encircles the clutch pin and is compressed between the spring seat and the clutch pin collar.

When the collar engages the carrier disc, the rear end portion 59 of the pin extends into one of the notches 52 in the brake member. The front end portion of the clutch pin is formed into a hook 61 through which the fishing line 62 passes. The pin can move forwardly against the bias of the spring whereupon the rear end portion of the pin is withdrawn from the notch 52.

The winding guide 63 is secured to the carrier disc radially inward from the clutch pin aperture 54 and spring seat member 57. The forward portion thereof is hooked, extending from the point 64 outwardly with respect to the axis 16, and then toward the rear, and terminating at 66. It may be grooved to receive and protect the front portions of the clutch pin 53. Sufficient space 67 is provided between the front portion of the winding guide and the hook of the clutch pin to accommodate the axial movement of the pin which occurs when it enters and leaves the notches in the brake member.

The winding guide and the clutch pin hook are disposed so that the forwardmost portions thereof are located near an imaginary plane normal to the axis 16 and lying just to the rear of the rearwardmost point that the front flange of the spool can reach during the rotation thereof. This plane is identified by the reference numeral 68 in FIGURE 1. The distance between the front and rear flanges of the spool, the spool axis angle, and the flange diameter are usually selected so that the plane 68 is ahead of the most forward portion of the rear flange of the spool. In this way, guiding of the line properly onto the spool by the winding guide is assured regardless of the location of the guide circumferentially in its circle of rotation.

A crank shaft 69 is supported on the frame by bearings at 71 and 72. A crank handle 73 and knob 74 are mounted to one end of the shaft, and a thrust bearing nut 76 is secured to the other end. The splines 77 receive the internal spline of the drive gear 78, which is axially slidable thereon. Therefore, while gear 78 is shown in mesh with gear 43, it is slidable out of mesh to the position shown by the dotted outline in FIGURE 1.

A flanged member 79 is secured to the gear 78 and has the annular channel 81 receiving the two ends 82 and 83 of a shift fork 84. A circular disc 86 is integral with and supports the two legs of the shift fork, and the outer surfaces of the legs where they join the disc are cylindrical and flush with the periphery of the disc.

A generally cylindrical housing 87 is integral with the frame and is supported thereby. This housing has a first inner cylindrical surface 88 receiving the peripheral surface 89 of the disc and thereby supporting the disc and accommodating axial and rotational motion of the disc with respect to the housing. A second inner cylindrical surface 91 is provided in the housing and receives and supports the peripheral surface of the boss 92 which is integral with the disc 86. In this manner, additional support for the disc is provided.

To control the axial movement (shifting) of the shift fork, and thereby the engagement and disengagement of the gears 78 and 43, an oblique slot 93 is provided in the housing 87 and receives a stem 94 which is secured to the disc 86 and extends radially outward therefrom through the slot. The stem 94 can be moved back and forth in the slot manually in the direction of the arrows 96 and 97 respectively, to disengage and engage the gears.

An axially extending circular flange 98 is secured to the rear face of the brake member. Brake bands 99 and 101 are engaged with the cylindrical surface of the flange 98. The bands can conveniently be provided by the use of a single metal strip formed generally in a U-shaped portion 102 with the semicircular portions extending therefrom. The U-shaped portion is secured to the portion 103 of the frame by means of the screw passing through apertures in the U-shaped portion and threadedly received in the frame. A spring washer 106 is provided under the head of the screw and facilitates application of the amount of force on the U-shaped portion which is necessary to apply the bands to the cylindrical surface 107 of the flange 98 with the amount of force necessary to provide the drag required to avoid backlash during a cast of the line.

A brake block 108 is mounted to the shaft 109 having a button 111 at its rear end. The button may be operated by an arm 112 pivotally mounted to the frame at 113. The brake block is engageable with the rear face of the carrier disc when the arm 112 is pressed by the thumb. The block is normally disengaged from the carrier disc because of the coil spring 114 disposed between the frame and the button.

A line pickup guide 116 includes an arm 117 pivotally mounted to the frame at 118 and having an eye 119 at its free end, with the fishing line passing through the eye. A rod 121 is pinned to the arm 117 at 122 and passes through an aperture 123 in the frame. A trigger 124 is provided at the rear end of the rod 121.

A coil spring 126 normally retains the pickup guide in the position shown. However, by pulling the trigger 124, the pickup guide can be moved against the spring bias to the position shown by the dotted outlines, for a purpose to be described hereinafter.

The use of the present invention will first be described with reference to casting with the line spool rotating. For this purpose, the fishing line passes through the hook 61 of the clutch pin, and accordingly it passes through the U-shaped portion of the winding guide 63. The line also passes through the eye of the pickup guide, the eye being ahead of the spool in the position shown by the solid outline in FIGURE 1.

The shift stem 94 is moved to the rear of the slot, disengaging the gears 78 and 43. The brake adjustment screw 104 is adjusted to apply the proper drag when the clutch engages at some time during the end of the cast. The spring seat member 57 is screwed into or out of the carrier disc to provide the compression on spring 58 which will allow the clutch to engage when the line tension drops below a minimum desired value during the cast. The fisherman's thumb is rested upon the arm 112 to be ready to apply additional braking effort against the carrier disc during the cast, if it becomes desirable for any reason. Then the cast is made.

When it is desired to reel the line back onto the spool, the clutch stem is moved forward in the slot to engage the gears 78 and 43. The crank handle is then turned to reel in the line. During this operation, the winding guide turns counterclockwise, when viewed from the front of the reel, and the spool turns clockwise. Assuming that gears 22 and 34 are of the same general size, the winding guide will make one half turn in one direction while the spool makes one-half turn in the opposite direction. At the same time, the line will wrap the spool once. It will wrap from the inside face or rear flange of the spool, to the outside face or front flange of the spool.

To avoid wrapping of the line at the same point on the spool at each turn, the number of teeth on gear 22 is made slightly different from the number on gear 34. For example, gear 22 may have twenty teeth thereon and gear 34 may have twenty one teeth thereon.

If for any reason it is desired that there be a substantial difference between winding guide speed and spool speed, this can be accomplished by changing the sizes of the gears providing the drive between the carrier disc and the spool. For example, if it is desired that the spool speed be much higher than the guide speed, gear 22 on the carrier disc can be substituted for by a large gear engaging the idler 41. Idler 39 would then drive gear 34, and therefore the line spool, at a much faster speed than the winding guide speed, as the hand crank is turned.

To use the reel for spinning, the trigger 124 is pulled to move the eye of the line pickup in an arc about the pivot 118. The eye is moved to the position shown by the dotted outline in FIG. 1, this position being radially outward of the spool and behind the winding guide. This pulls the line back out of the U-shaped portions of the clutch pin and winding guide. Then the crank handle is turned slightly in the direction of the arrow 127 to move the straight portions of the winding guide and clutch pin away from the line. Then the trigger is released, whereupon the spring 126 returns the pickup guide eye to its original position.

The reel is then ready for spinning the line off the front end of the spool. To hold the spool stationary during the spinning, the fisherman's thumb may be pressed against the arm 112 to hold the brake block 108 against the carrier disc.

To reel in the line, it is necessary only to again pull the trigger as the crank handle is turned in the normal reeling-in direction of the arrow 128. The handle of the fishing rod may be held in the left hand, as usual, during reeling, and the trigger may be pulled by the fingers of the left hand. However, a latch 131 pivoting on the frame 132 can be moved into the notch 133 to hold the trigger back. A sliding or other type of latch may be used instead of the pivoting latch, if desired. Normally, however, it is only necessary to pull the trigger for a moment until the winding guide begins to wind the line onto the spool.

It may be found desirable, where the reel is to be used primarily for spinning, to have the winding guide turn at a much higher speed than the spool during the line rewinding operation. For this purpose, a large gear may be secured to the rear face of the spool to replace or substitute for gear 34. This large gear engages idler 41 which is driven by gear 22 through idler 39, the latter being secured to and operating in unison with idler 41.

From the foregoing description, it should be apparent that the reel of the present invention can be operated for both casting and spinning, with the reel on top of the fishing rod. Also, it is easily adapted to winding by the left hand, if desired, whereupon a crank handle can be mounted either by an extension or directly to the left end of the crank shaft 69 in place of the nut 76, with the extension or the handle itself serving as the left end thrust bearing, and secured to the end of the shaft by a nut.

The embodiment of the invention which has been illustrated and described is given merely by way of example, and not by way of limitation, as various modifications are possible within the scope of the appended claims.

I claim:
1. A fishing reel comprising:
   a frame;
   a spool rotatably mounted on said frame and adapted to carry a line wound thereon;
   a line winding guide and carrier mounted on said frame for rotation around said spool for winding line thereon;
   a line pickup guide having a line engaging pickup portion;
   and means mounting said line pickup guide for movement from a position in which said line pickup portion permits engagement of said line with said winding guide to a position disengaging said line from said winding guide.

2. A fishing reel comprising:
   a frame;
   a spool of fishing line mounted on said frame for rotation;
   a guide carrier member mounted on said frame for rotation;
   a line winding guide mounted to said carrier member to move around said spool as said carrier member rotates;
   means coupled to said carrier member for rotation thereof;
   reverse driving means coupling said spool to said carrier member whereby said spool is rotated in one direction by rotating said carrier in the opposite direction;
   a brake member mounted for rotation on said frame and adjacent to said carrier member, said brake member having first clutch means thereon;
   a friction applying device mounted to said frame and engaging a portion of said brake member and being adjustable to establish a desired braking effort;
   second clutch means mounted on said carrier member and engaging said first clutch means to drive said braking member in rotation with said carrier member as said carrier member rotates whereby a braking effort is applied to said carrier member;
   means biasing said second clutch means into engagement with said first clutch means;
   and a line receiving portion on said second clutch means adjacent said winding guide and so formed as to enable tension on said line to disengage said second clutch means from said first clutch means and allow said carrier member to rotate independent of said brake member whenever line tension exceeds a predetermined amount.

3. A fishing reel comprising:
   a frame;
   a spool of fishing line mounted on said frame for rotation;
   a guide carrier member mounted on said frame for rotation;
   a line winding guide mounted to said carrier member to move around said spool as said carrier member rotates;
   means coupled to said carrier member for rotation thereof;
   reverse driving means coupling said spool to said carrier member whereby said spool is rotated in one direction by rotation of said carrier in the opposite direction;
   a brake member mounted for rotation on said frame and adjacent to said carrier member, said brake member having first clutch means thereon;
   a friction applying device mounted to said frame and engaging a portion of said brake member and being adjustable to establish a desired braking effort;
   second clutch means mounted on said carrier member and engaging said first clutch means to drive said braking member in rotation with said carrier member as said carrier member rotates whereby a braking effort is applied to said carrier member;
   means biasing said second clutch means into engagement with said first clutch means;
   a line receiving portion on said second clutch means adjacent said winding guide and so formed as to enable tension on said line to disengage said second clutch means from said first clutch means and allow said carrier member to rotate independent of said brake member whenever line tension exceeds a predetermined amount;
   a line pickup guide pivotally mounted to said frame and having a line receiving portion movable in an arc upon the pivoting of said pickup guide, between a position radially outward of said spool and behind the winding guide to a position ahead of said spool, for releasing said line from said winding guide and the line receiving portion of said second clutch means to orient said line to accommodate spinning line off the end of said spool;

means biasing said pickup guide to the position placing said line receiving portion thereof ahead of said spool;

and a trigger mounted to said frame and connected to said pickup guide for actuation thereof against the bias thereon.

4. A fishing reel comprising:
a frame;
a line carrying spool mounted on said frame for rotation;
a guide carrier member mounted on said frame for rotation;
a line winding guide mounted to said carrier member to move around said spool as said carrier member rotates;
a brake member mounted for rotation on said frame and adjacent to said carrier member, said brake member having first clutch means thereon;
a friction applying device mounted to said frame and engaging a portion of said brake member; and
second clutch means on said carrier member and engaging said first clutch means to drive said braking member in rotation with said carrier member as said carrier member rotates.

5. A fishing reel comprising:
a frame;
a spool of fishing line mounted on said frame for rotation;
a guide carrier member mounted on said frame for rotation;
a line winding guide mounted to said carrier member to move in a circle around said spool;
a crank handle coupled to said carrier member for rotation thereof;
an idler shaft extending from said frame between said spool and said carrier member and having an idler gear thereon;
a gear on said spool meshing with said idler gear;
a gear on said carrier member meshing with said idler gear whereby said winding guide is turned clockwise and said spool is turned counterclockwise as said crank handle is turned;
a brake member mounted for rotation on said frame and disposed in closely spaced relation to said carrier member, said brake member having clutch means therein and said brake member being rotatable with said carrier member;
a friction applying device mounted to said frame and engaging a portion of said brake member and being adjustable to establish a desired braking effort;
a detent member mounted on said carrier member and having a portion engaging said clutch means to drive said braking member in rotation with said carrier member as said carrier member rotates whereby a braking effort is applied to said carrier member;
spring means biasing said detent member in a direction extending said portion thereof into position engaging said clutch means;
a line receiving portion on said detent member adjacent said winding guide and so formed as to enable tension on said line to disengage said detent member from said clutch means and allow said carrier member to rotate independent of said brake member whenever line tension exceeds a predetermined amount;
a line pickup guide pivotally mounted to said frame and having a line receiving portion movable in an arc upon the pivoting of said pickup guide, between a position radially outward of said spool and behind the winding guide to a position ahead of said spool, for releasing said line from said winding guide and the line receiving portion of said pin to orient said line to accommodate spinning;
a second spring biasing said pickup guide to the position placing said line receiving portion thereof ahead of said spool;
and a trigger mounted to said frame and connected to said pickup guide for actuation thereof against the bias of said second spring.

6. A fishing reel comprising:
a frame;
a spool of fishing line mounted on said frame for rotation on a first axis;
a guide carrier disc mounted on said frame for rotation on a second axis intersecting said first axis at an angle;
a line winding guide mounted to said carrier disc to move in a circle around said spool;
a splined shaft having a third axis normal to said second axis;
a crank handle mounted to said shaft for rotation thereof;
a drive gear splined to said shaft and axially slidable thereon;
a driven gear secured to said carrier disc and engaged by said drive gear to drive said disc as said crank handle rotates said shaft;
lever means operably associated with said drive gear for axially sliding said drive gear on said spline to selectively disengage and engage said drive gear with said driven gear to accommodate casting and rewinding, respectively;
an idler shaft extending from said frame between said spool and said carrier disc and having first and second idler gears thereon and secured together to rotate together at the same speed;
a gear on said spool meshing with said first idler gear;
a gear on said carrier disc meshing with one of said idler gears whereby said winding guide is turned clockwise and said spool is turned counterclockwise as said crank handle is turned, the ratio of number of teeth in the gear on the carrier to number of teeth in the gear on the spool being selected to produce the desired ratio of speed of the spool with respect to speed of the carrier;
a brake member disposed in parallel, closely spaced relation to said carrier disc, said brake member having a plurality of notches in the outer perimeter thereof, said notches extending on said perimeter for a substantial portion thereof, and said brake member being rotatable with said disc;
a friction applying device mounted to said frame and engaging a portion of said brake member and being adjustable to establish a desired braking effect;
a pin mounted on said carrier disc and having a portion extending through an aperture in said disc and received in one of said notches to drive said brake member in rotation with said disc as said disc rotates whereby a braking effort is applied to said carrier member;
a coil spring encircling said pin and biasing said pin in a direction extending said portion into position received by one of said notches;
a line receiving portion on said pin adjacent said winding guide and so formed as to accommodate pulling of said pin against the force of said spring when there is tension on said line to disengage said pin from said notches and allow said carrier disc to rotate independent of said brake member whenever line tension exceeds a predetermined amount;
a manually operable hold device engageable with said brake member to accommodate manual application of a desired braking force on said brake member;

a line pickup guide pivotally mounted to said frame and having a line receiving loop movable in an arc upon the pivoting of said pickup guide, between a position radially outward of said spool and behind said winding guide to a position ahead of said spool, for releasing said line from said winding guide and the line receiving portion of said pin to orient said line to accommodate spinning;

a second spring biasing said pickup guide to the position placing said line receiving loop thereof ahead of said spool;

and a trigger mounted to said frame and connected to said pickup guide for actuation thereof against the bias of said second spring.

References Cited by the Examiner

UNITED STATES PATENTS

| | | | |
|---|---|---|---|
| 890,892 | 6/1908 | Douglass | 242—84.54 |
| 2,470,507 | 5/1949 | Luton et al. | 242—84.5 X |
| 2,796,224 | 6/1957 | Jefferson | 242—84.2 |

FOREIGN PATENTS

| | | |
|---|---|---|
| 894,624 | 3/1944 | France. |
| 987,475 | 4/1951 | France. |
| 437,502 | 10/1935 | Great Britain. |

MERVIN STEIN, *Primary Examiner.*

B. S. TAYLOR, *Assistant Examiner.*